United States Patent
Gopalakrishnan et al.

(10) Patent No.: US 9,866,157 B2
(45) Date of Patent: Jan. 9, 2018

(54) METHOD AND APPARATUS FOR A POSITION SENSOR FOR A TRANSMISSION INTEGRATED SYNCHRONOUS MOTOR

(71) Applicant: GM GLOBAL TECHNOLOGY OPERATIONS LLC, Detroit, MI (US)

(72) Inventors: Suresh Gopalakrishnan, Troy, MI (US); Chandra S. Namuduri, Troy, MI (US); Lei Hao, Troy, MI (US); Alexandru Rajala, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 14/854,187

(22) Filed: Sep. 15, 2015

(65) Prior Publication Data
US 2017/0077848 A1    Mar. 16, 2017

(51) Int. Cl.
*H02K 29/08* (2006.01)
*H02P 6/16* (2016.01)
*H02K 11/215* (2016.01)

(52) U.S. Cl.
CPC .............. *H02P 6/16* (2013.01); *H02K 11/215* (2016.01)

(58) Field of Classification Search
CPC ........ H02K 29/08; H02K 11/20; H02K 21/16; H02K 3/522; H02K 11/00; H02K 11/25; H02K 15/022; H02K 15/095; H02K 16/04; H02K 1/141; H02K 1/146; H02K 1/185; H02K 1/276; H02K 1/278; H02K 1/2786

USPC ...... 318/400.32, 688, 400.38, 400.2, 400.15, 318/432; 310/68 B
See application file for complete search history.

(56) References Cited

U.S. PATENT DOCUMENTS

| | | | | |
|---|---|---|---|---|
| 6,826,499 | B2* | 11/2004 | Colosky | H02P 6/182 702/85 |
| 6,935,450 | B1* | 8/2005 | Tsuzuki | B60K 6/26 180/65.26 |
| 7,518,273 | B2* | 4/2009 | Kataoka | H02K 29/08 310/68 B |
| 7,816,881 | B2* | 10/2010 | Wiegers | H02P 6/16 318/560 |
| 8,421,391 | B2* | 4/2013 | Yeh | G01K 7/42 318/400.15 |
| 2002/0047425 | A1* | 4/2002 | Coupart | B66D 1/12 310/156.01 |
| 2003/0076060 | A1* | 4/2003 | Colosky | H02P 6/182 318/400.32 |

(Continued)

*Primary Examiner* — Paul Ip

(57) ABSTRACT

A transmission assembly has an integrated torque machine including a torque machine stator and a torque machine rotor. The torque machine rotor includes at least one set of rotor magnets. An integrated rotational position sensor is configured to monitor rotational position of the torque machine rotor in relation to the torque machine stator. The integrated rotational position sensor includes a sensor rotor element and a sensor stator element. The sensor rotor element includes at least one set of sensor rotor magnets. The sensor rotor element is positioned such that the at least one set of sensor rotor magnets are aligned with respect to a rotor pole of the at least one set of rotor magnets of the torque machine rotor. The sensor stator element is positioned such that the sensor stator element is aligned with a magnetic axis of the torque machine stator.

8 Claims, 6 Drawing Sheets

(56) References Cited

U.S. PATENT DOCUMENTS

| | | | | |
|---|---|---|---|---|
| 2005/0248306 A1* | 11/2005 | Chen | ............... | H02P 25/03 |
| | | | | 318/712 |
| 2006/0125334 A1* | 6/2006 | Kataoka | ............ | H02K 29/08 |
| | | | | 310/68 B |
| 2006/0261807 A1* | 11/2006 | Morita, Jr. | ............ | H02P 6/16 |
| | | | | 324/251 |
| 2007/0145838 A1* | 6/2007 | Uchitani | ............ | H02K 3/522 |
| | | | | 310/68 B |
| 2008/0012522 A1* | 1/2008 | Wiegers | ............ | H02P 6/16 |
| | | | | 318/638 |
| 2008/0018281 A1* | 1/2008 | Kim | ............ | H02P 6/34 |
| | | | | 318/445 |
| 2009/0224627 A1* | 9/2009 | Hino | ............ | H02K 1/276 |
| | | | | 310/216.077 |
| 2011/0279074 A1* | 11/2011 | Yeh | ............ | G01K 7/42 |
| | | | | 318/432 |
| 2012/0235668 A1* | 9/2012 | Janecek | ............ | G01R 33/072 |
| | | | | 324/117 H |
| 2013/0134967 A1* | 5/2013 | Kaufmann | ............ | H02P 6/185 |
| | | | | 324/207.25 |
| 2013/0221810 A1* | 8/2013 | Gopalakrishnan | ..... | H02K 29/06 |
| | | | | 310/68 B |
| 2013/0271122 A1* | 10/2013 | Kino | ............ | G01B 7/30 |
| | | | | 324/207.25 |
| 2016/0214648 A1* | 7/2016 | Schoepe | ............ | B62D 15/0215 |

\* cited by examiner

METHOD AND APPARATUS FOR A POSITION SENSOR FOR A TRANSMISSION INTEGRATED SYNCHRONOUS MOTOR

TECHNICAL FIELD

This disclosure is related to transmission systems for powertrain systems that include transmission-mounted torque machines, and position sensors mounted thereon.

BACKGROUND

The statements in this section merely provide background information related to the present disclosure. Accordingly, such statements are not intended to constitute an admission of prior art.

Known vehicle systems employ powertrain systems including non-hydrocarbon-fueled torque machines, e.g., electric machines to transform electric power to mechanical torque to generate tractive effort and transform mechanical effort to electrical power. Such powertrain systems include hybrid powertrain systems, electric vehicle systems, and extended-range electric vehicle powertrain systems. Such powertrain architectures may be configured to transfer tractive torque to an output member through a transmission device. Known hybrid powertrain architectures can include series-hybrid configurations, parallel-hybrid configurations, and compound-split hybrid configurations. Electric machines configured to operate as motors and generators can be controlled to generate torque inputs to the transmission independently from a torque input from an internal combustion engine. The electric machines may react and transform vehicle kinetic energy transmitted through the vehicle driveline to electrical energy that is storable in an electrical energy storage device employing regenerative braking and other methods.

High-resolution position sensors, e.g., reluctance-type resolvers, may be used to determine rotor position feedback. The resolvers provide rotor position information with high resolution at high accuracy suitable for precise torque and position control in the torque machines. Known reluctance-type resolvers are mounted at one end of a motor shaft with an inner rotor/outer stator arrangement or an outer rotor/inner stator arrangement, and provide rotor position feedback. Issues associated with mounting high-resolution position sensors in transmission systems include limited space availability and packaging constraints. Packaging a position sensor onto a motor shaft within a transmission device can introduce challenges due to limited space availability. Additionally, reluctance type resolvers are expensive. A potential alternative is the use of a Hall-effect based digital sensor to determine rotor position feedback.

SUMMARY

A transmission assembly has an integrated torque machine including a torque machine stator and a torque machine rotor. The torque machine rotor includes at least one set of rotor magnets. An integrated rotational position sensor is configured to monitor rotational position of the torque machine rotor in relation to the torque machine stator. The integrated rotational position sensor includes a sensor rotor element and a sensor stator element. The sensor rotor element includes at least one set of sensor rotor magnets. The sensor rotor element is positioned such that the at least one set of sensor rotor magnets are aligned with respect to a rotor pole of the at least one set of rotor magnets of the torque machine rotor. The sensor stator element is positioned such that the sensor stator element is aligned with a magnetic axis of the torque machine stator.

BRIEF DESCRIPTION OF THE DRAWINGS

One or more embodiments will now be described, by way of example, with reference to the accompanying drawings, in which.

DETAILED DESCRIPTION

Figure 1:
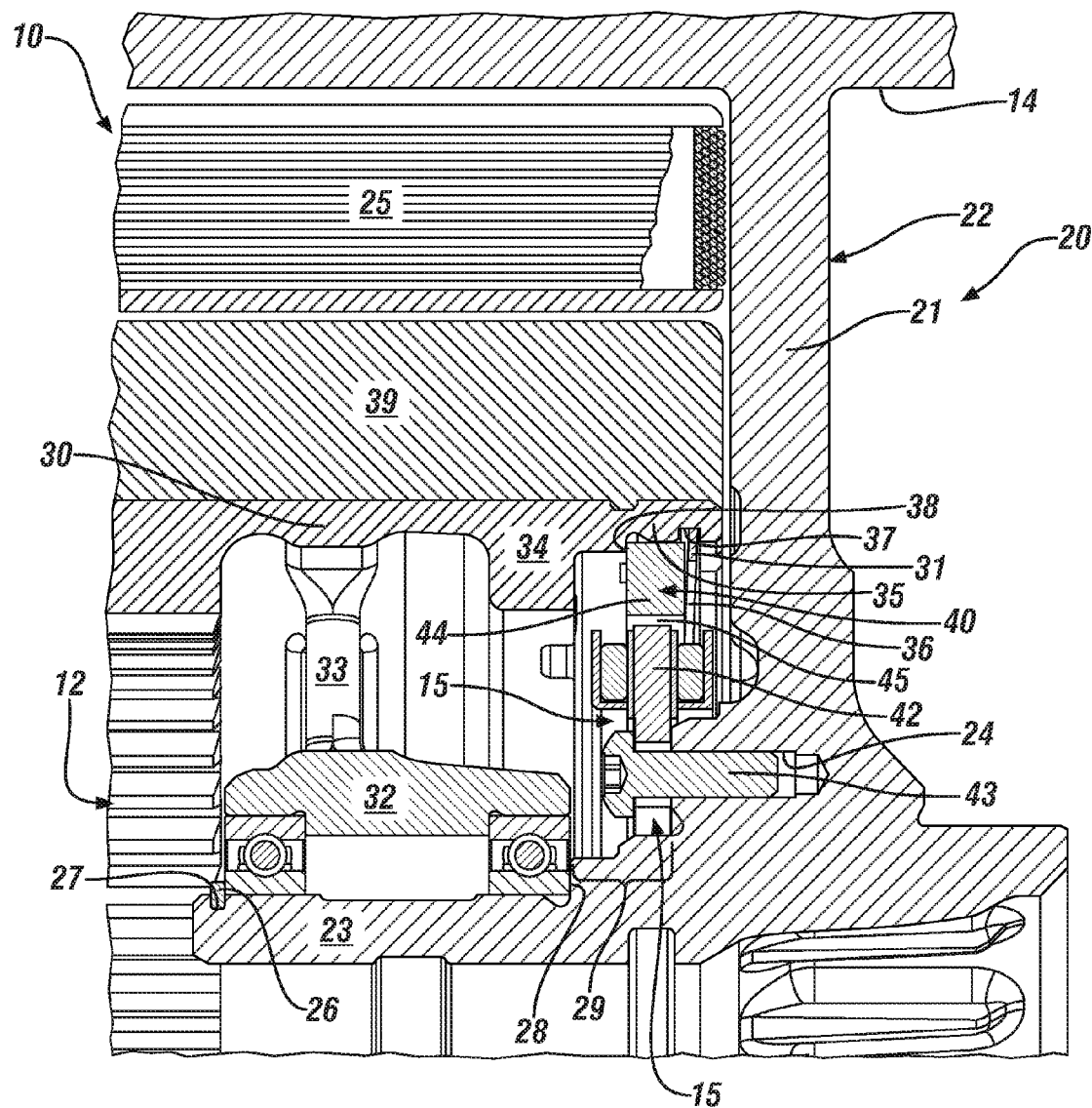
FIG. 1 illustrates a partial sectional view of a transmission including a transmission-mounted torque machine having an inner rotor and outer stator and including a rotational position sensor arranged with a radial airgap in accordance with the disclosure.
Figure 2:
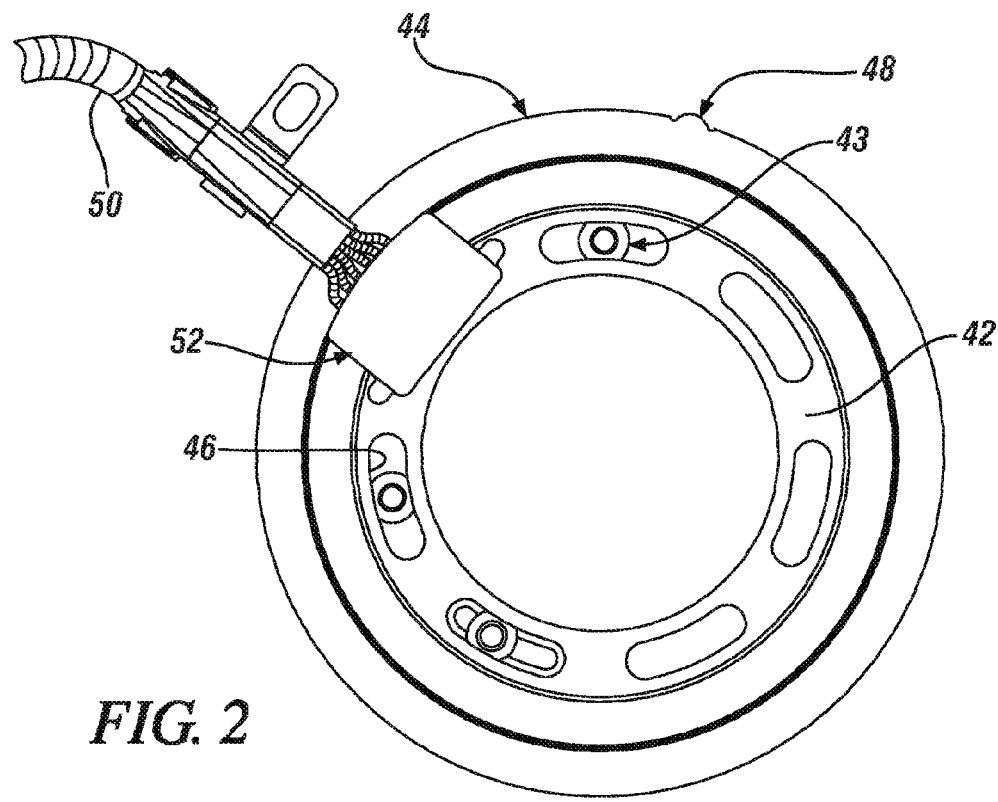
FIG. 2 illustrates a partial side view of the transmission including the transmission-mounted torque machine having the inner rotor and outer stator configuration with the rotational position sensor arranged with the radial airgap in accordance with the disclosure.

Referring now to the drawings, wherein the showings are for the purpose of illustrating certain exemplary embodiments only and not for the purpose of limiting the same, FIGS. 1 and 2 show partial views of a transmission system 10 including an integrated torque machine 20 configured with an annular-shaped sensor envelope 15 that accommodates an integrated rotational position sensor 40. The torque machine 20 is configured to generate and transfer torque to a transmission output member via rotating and fixed elements of the transmission system 10 for use in propulsion and other functions. FIG. 1 shows a partial sectional view of the transmission system 10, and FIG. 2 shows a partial plan view of the transmission system 10. As shown the torque machine 20 is an electrically-powered motor/generator. The torque machine 20 in this embodiment is arranged in a configuration that includes an outer stator 22, a coaxial inner rotor 30, and the rotational position sensor 40 assembled into the sensor envelope 15 to monitor rotational position of the rotor 30 in relation to the stator 22.

The stator 22 includes an annular-shaped first electric motor portion 25 and a frame 21 that is secured to a case 14 of the transmission 10 to provide structural support for a spindle 23 that projects axially from the frame 21. The spindle 23 includes a non-bearing portion 29, a shoulder 28, and a counter-cut recess 27, with a cylindrically-shaped outer bearing surface between the shoulder 28 and the counter-cut recess 27. A retaining ring 26 can be inserted into the counter-cut recess 27, thus mechanically securing a bearing portion 32 of the rotor 30 onto the outer bearing surface of the spindle 23. The shoulder 28 of the stator 22 defines and thus limits axial location of the bearing portion 32 of the rotor 30 in relation to the frame 21. The non-bearing portion 29 of the spindle 23 is located between the shoulder 28 of the stator 22 and the frame 21. Mounting bolt holes 24 are machined into the frame 21 in an annular pattern to provide mounting support for the position sensor 40.

The rotor 30 includes the bearing portion 32, a support portion 33, and a rotor hub 34. The rotor hub 34 includes an outer cylindrically-shaped surface that couples to an annular-shaped second electric motor portion 39 that is coaxial with and adjacent to the first electric motor portion 25. The rotor hub 34 includes a hub extension 35 that extends axially in one direction beyond the bearing portion 32 towards the frame 21 of the stator 22. The hub extension 35 of the rotor hub 34 includes an inner surface including a first shoulder 38 and a recess 37. The rotor 30 fixedly couples to a gear element 12 of the transmission 10 and rotates therewith. The bearing portion 32 of the rotor 30 mounts onto the outer bearing surface of the spindle 23 permitting the rotor 30 to rotate thereon, with the direction of rotation determined based upon operating parameters of the torque machine 20 and the transmission 10. The bearing portion 32 includes suitable elements that can be inserted onto the bearing portion of the spindle 23 for rotating thereon, including, e.g., roller bearings or other elements permitting low-friction rotation.

The annular-shaped sensor envelope 15 is formed between an inner surface of the hub extension 35 of the rotor 30 and an outer surface of the non-bearing portion 29 of the spindle 23. The sensor envelope 15 accommodates any one of a plurality of types of rotational position sensors 40. In an exemplary embodiment the rotational position sensors 40 may include Hall-effect sensors.

The rotational position sensor 40 includes a sensor stator 42 that is mechanically decoupled from a sensor rotor 44, preferably including an airgap 45 formed therebetween. The sensor stator 42 assembles onto and fixedly attaches to the spindle 23 of the stator 22. The sensor rotor 44 fixedly attaches to the rotor hub 34. The sensor stator 42 and the sensor rotor 44 are configured to form a radially-oriented airgap 45 as shown. The sensor stator 42 includes a wiring harness 50 and harness support 52 including a strain relief element. The wiring harness 50 and harness support 52 are employed to enable routing of power supply and signal cables between the sensor stator 42 and an on-vehicle control module.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The sensor stator 42 includes a plurality of alignment slots 46, and is fixedly attached to the stator 22 of the torque machine 20 using a plurality of mounting bolts 43 that pass through the alignment slots 46 and fasten the sensor stator 42 to the stator 22. Angular adjustment and alignment of the sensor stator 42 in relation to the sensor rotor 44 can be accomplished by rotationally adjusting the sensor stator 42 within the alignment slots 46, e.g., in relation to a rotor key 48 using a suitable alignment process during assembly. The alignment slots 46 are preferably curved, but can be any suitable shape that permits rotational adjustment about the axis of rotation, e.g., a linear shape. The mounting bolt holes 24 are preferably located to avoid other features, e.g., oil lube lines, and permit rotational freedom to place the bolts 43 as appropriate and required. In an exemplary embodiment the sensor stator 42 may be mounted with respect to the stator 22 of the torque machine using a locator-pin arrangement such that a rising edge of a first commutation signal generated by the rotational position sensors 40 of the sensor stator 42 align with a positive zero-crossing of the motor Phase-A back-emf.

The sensor rotor 44 slip-fits into the rotor hub 34 with the rotor key 48 inserted into a corresponding keyway on the rotor 30 in one embodiment, or can be otherwise aligned with the rotor 30. The sensor rotor 44 fits against the first shoulder 38 and is held securely in place by a wave spring 36. The tolerance between the inside diameter of the rotor hub 34 at the hub portion 35 and the outside diameter of the sensor rotor 44 is sufficiently tight to minimize radial movement of the sensor rotor 44 in relation to the rotor hub 34 while allowing assembly thereof. The wave spring 36 maintains compressive force on the sensor rotor 44 against the first shoulder 38 thereby securing the sensor rotor 44 in place to prevent axial movement of the sensor rotor 44 in relation to the rotor hub 34 and prevent rotation of the sensor rotor 44 in relation to the rotor 30. The wave spring 36 is preferably deployed in conjunction with a locking snap ring 31 that inserts into the recess 37 formed on the inside face of the rotor hub 34 to fixedly secure the sensor rotor 44 against the first shoulder 38. Axial force from the wave spring 36 onto the sensor rotor 44 prevents rotation of the sensor rotor 44 in relation to the rotor hub 34 through friction. On embodiments employing rotor key 48, axial force from the wave spring 36 onto the sensor rotor 44 in conjunction with insertion of the rotor key 48 into the keyway of the rotor 30 prevents rotation of the sensor rotor 44 in relation to the rotor hub 34 through friction and interference. Control of the torque machine 20 may be simplified by aligning the sensor rotor 44 and the sensor stator 42 to a known reference angle on the rotor 30 and stator 20 of the torque machine 20 respectively. In an exemplary embodiment the sensor rotor 44 includes a plurality of sensor rotor magnets which are magnetized in a predefined pattern. The rotor magnets are aligned with respect to rotor poles of the torque machine 20 using the rotor key 48 and keyway of the rotor 30. The rotor key 48 and keyway of the rotor 30 are used to set the required pole pattern within the magnetizing fixture comprising the plurality of sensor rotor magnets and the magnets of torque machine rotor 30. By aligning the sensor rotor 44 and the sensor stator 42 of the position sensor to a known reference angle on the rotor 30 and stator 22 of the torque machine respectively, control of the torque machine 20 may be simplified.

Implementation of the transmission system 10 including the integrated torque machine 20 configured with the annular-shaped sensor envelope 15 between the stator 22 and the rotor 30 to accommodate the rotational position sensor 40 permits design flexibility in sensor selection, sensor mounting and transmission assembly without affecting sensor functional performance and with minimal or no changes to existing rotor/stator designs to accommodate alternative sensor types.

In an exemplary embodiment the rotational position sensor 40 may include a plurality of magnetic digital Hall-effect sensors. The magnetic digital Hall-effect sensors are arranged in a Hall sensor array. The rotation position sensor 40 may further include an ASIC for generating high resolution signals. The rotational position sensor 40 generates high resolution encoder pulses and commutation pulses that typically match the number of poles in the propulsion motor. The encoder and commutation pulses may then be combined by a processor to determine the absolute rotor position at any angle. In an exemplary embodiment a predefined phase relationship between the sensor commutation signals and the stator back-emf may be used to simplify control of the torque machine 20.

Preferred specification parameters for the rotational position sensor 40 include an acceptable accuracy, for example within ±1° to ±3° electrical degrees having a suitable resolution over a wide speed range, for example over a speed range of 0±15,000 RPM (mechanical) in one embodiment. As appreciated, a rotational angle in mechanical degrees has an equivalent angle in electrical degrees in relation to a number of pole pairs for the electric machine. For example, 1° electrical rotation has an equivalent mechanical rotation of 0.166° for an electric machine having 6-pole pairs. The sensor has an operational temperature over a wide range, for example between −40° C. to +140° C. in one embodiment, and is compatible with automatic transmission fluids.

Figure 3:
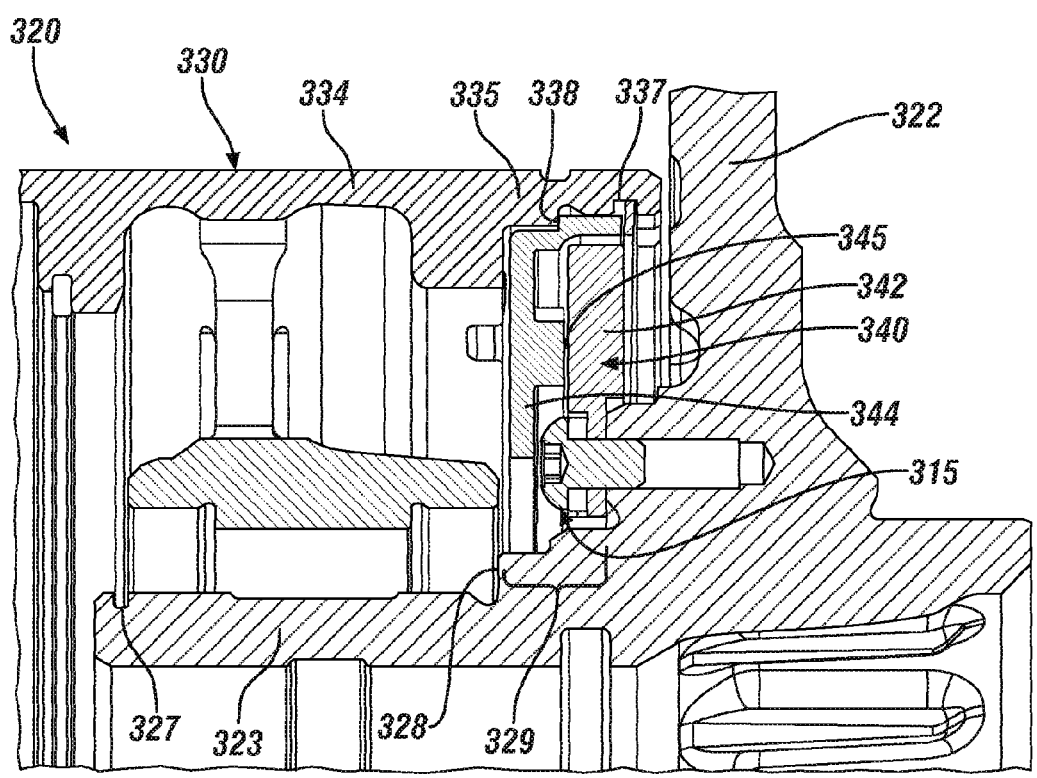
FIG. 3 illustrates a partial sectional view of the transmission including the transmission-mounted torque machine having an inner rotor and outer stator configuration and the rotational position sensor arranged with an axial airgap in accordance with the disclosure.

FIG. 3 shows partial sectional view of an integrated torque machine 320 for a transmission system configured with an annular-shaped sensor envelope 315 that accommodates an embodiment of an integrated rotational position sensor 340. The transmission system and integrated torque machine 320 are analogous to the system described with reference to FIG. 1. The sensor envelope 315 is analogous to the sensor envelope 15 described with reference to FIG. 1. The annular-shaped sensor envelope 315 is formed between an inner surface of hub extension 335 of the rotor 330 and an outer surface of a non-bearing portion 329 of a spindle 323 of stator 322. The sensor envelope 315 accommodates any one of a plurality of types of rotational position sensors 340, examples of which are described in Table 1. The stator 322 includes the non-bearing portion 329, shoulder 328, and counter-cut recess 327, with a cylindrically-shaped outer bearing surface between the shoulder 328 and the counter-cut recess 327. The rotor 330 includes rotor hub 334 including hub extension 335, shoulder 338 and recess 337. The rotational position sensor 340 includes a sensor stator 342 that is mechanically decoupled from a sensor rotor 344 via including an axial airgap 345 formed therebetween. The sensor stator 342 is fixedly attached to the stator 322 of the torque machine 320 and the sensor rotor 344 is fixedly attached to the rotor 324 of the torque machine 320. The annular-shaped sensor envelope 315 is thus configured to accommodate the rotational position sensor 340 including axial airgap 345.

Figure 4:
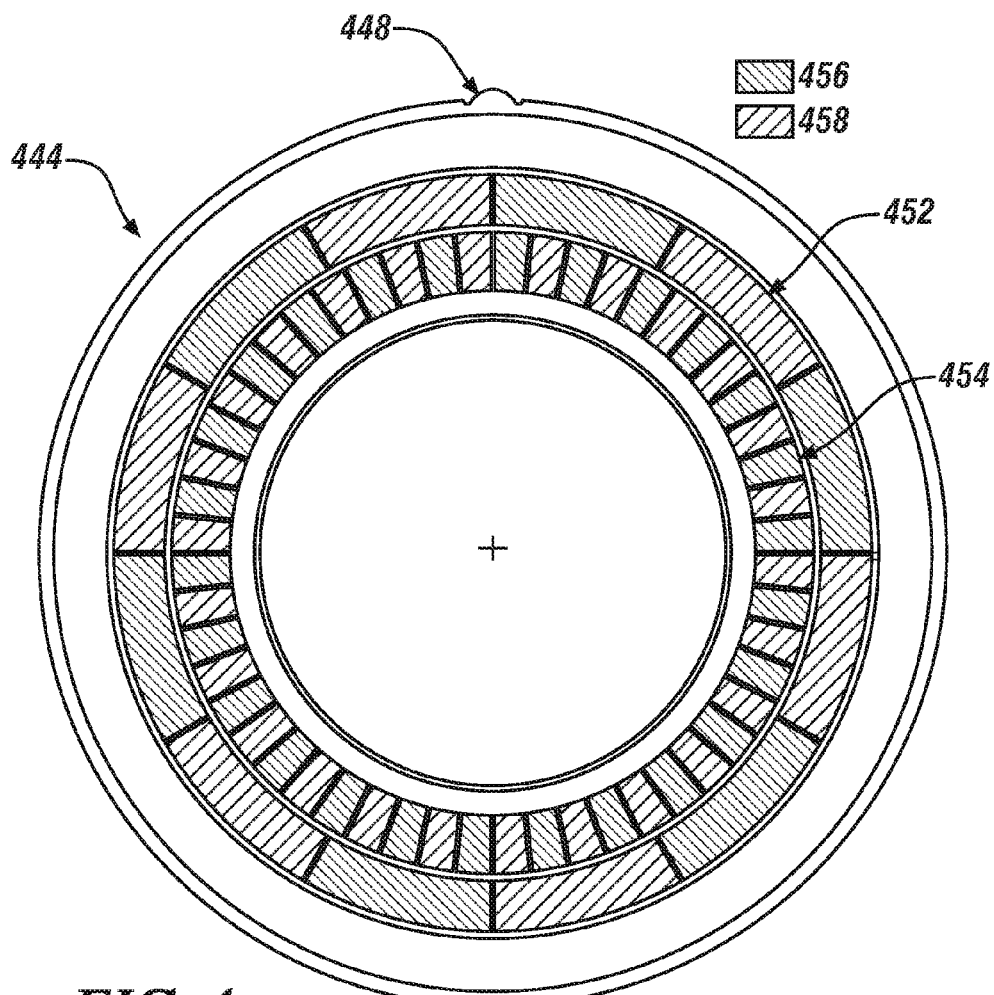
FIG. 4 illustrates a partial side view of the transmission including a sensor rotor of the rotational position sensor having an exemplary magnetization including a high resolution track and a commutation track in accordance with the disclosure.

FIG. 4 illustrates a partial side view of the transmission 10 including a sensor rotor 444 of the rotational position sensor having an exemplary magnetization including a high resolution magnetic track 454 and a commutation magnetic track 452. The commutation track 452 and the high resolution track 454 may be magnetized with reference to the key 448. In an exemplary embodiment, in a commercially available sensor, the high resolution track 454 is magnetized in a sinusoidal fashion and the commutation track 452 is magnetized in a rectangular fashion. The magnetic tracks comprise magnets arranged such that the magnets alternate between a north polarity 456 and a south polarity 458. An exemplary embodiment of the sensor rotor magnetization pattern will include a number of pole-pairs in the commutation track matching the number of pole-pairs in the torque machine 20.

Figure 5:
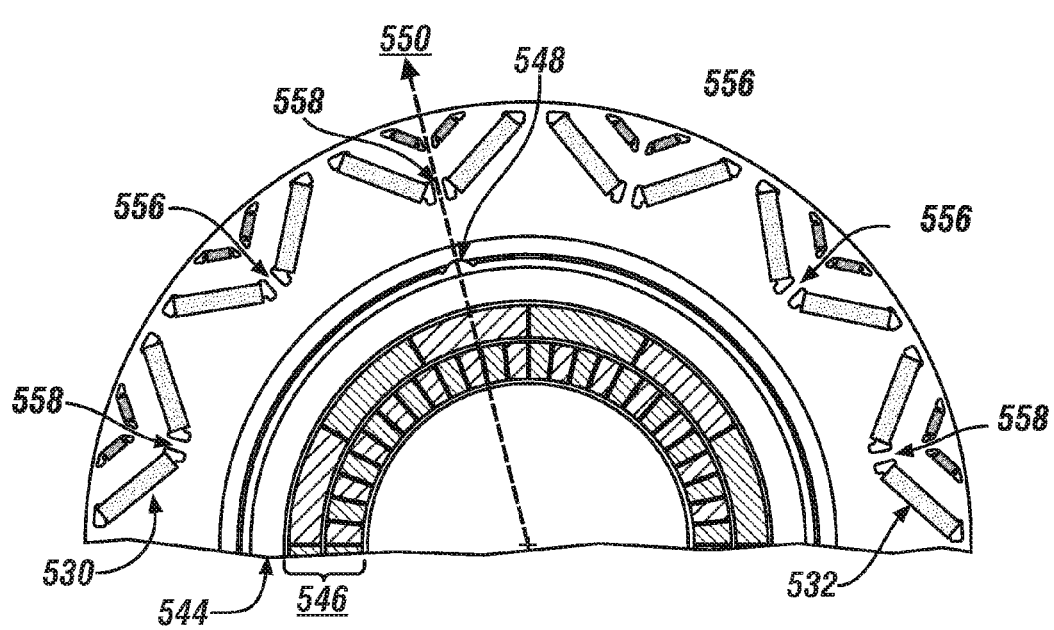
FIG. 5 illustrates a partial side view of the transmission including the sensor rotor and the torque machine rotor having an exemplary alignment along a magnetic axis in accordance with the disclosure.

FIG. 5 illustrates a partial side view of the transmission 10 including the sensor rotor 544 and the torque machine rotor 530 having an exemplary alignment along a magnetic axis 550. The key way 548 of the sensor rotor 544 is aligned with the d-axis 550 of the south pole of the torque machine. The plurality of rotor magnets 532 of the rotor 530 alternate polarities between south pole 558 and north pole 556 along the rotor 530. The key way mechanism 548 ensures that the alignment of the sensor rotor 544 is set and maintained, and providing a known alignment of the magnetic tracks 546 of the sensor rotor in relation to the rotor 30 of torque machine 20.

Figure 6:
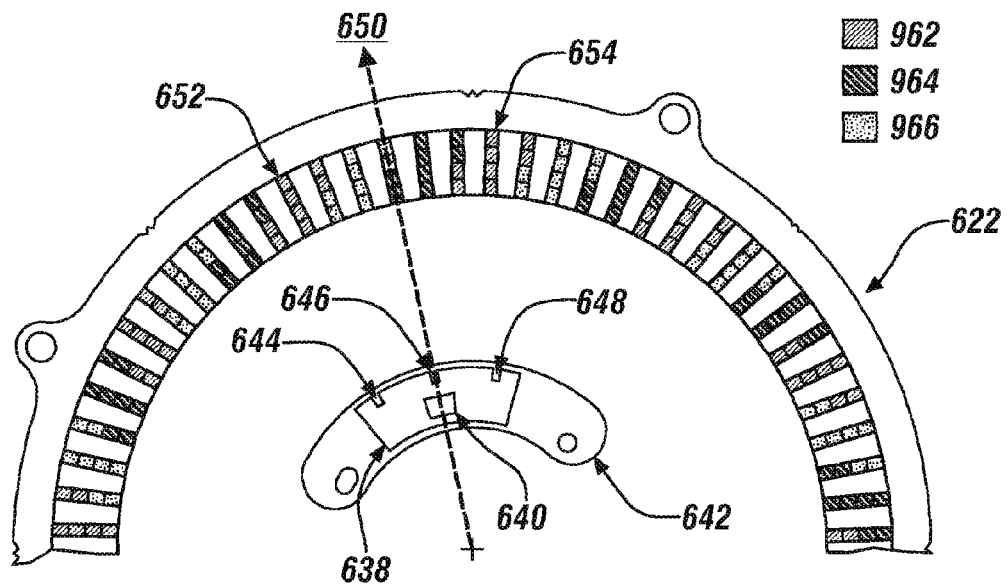
FIG. 6 illustrates a partial side view of the transmission including a sensor stator of the rotational position sensor and a torque machine stator having an exemplary alignment along a magnetic axis in accordance with the disclosure.

FIG. 6 illustrates a partial side view of the transmission 10 of FIG. 1 including a sensor stator 642 of the rotational position sensor and a torque machine stator 622 having an exemplary alignment along a magnetic axis 650. The sensor stator 642 includes a Hall sensor array, and an ASIC 638. The Hall sensor array includes Hall sensors $H_C$ 644, $H_A$ 646 and $H_B$ 648, which are used for generating the commutation signals in relation to the commutation track of the sensor rotor. The sensor stator 642 is positioned such that Hall sensor HA 646 is aligned to the magnetic axis of phase A 650 of the stator 622. The stator 622 has multiple phases, including Phase-A 962, Phase-B 964 and Phase-C 966. In an exemplary embodiment the Hall sensors 644, 646, 648 are separated by 120° divided by the number of pole-pairs in the torque machine. ASIC 640 is used for generating the high resolution signals. The sensor stator generates high resolution encoder pulses and commutation pulses that typically match the number of poles in the propulsion motor. The encoder and commutation pulses may then be combined by a processor to determine the absolute rotor position at any angle.

Figure 7:
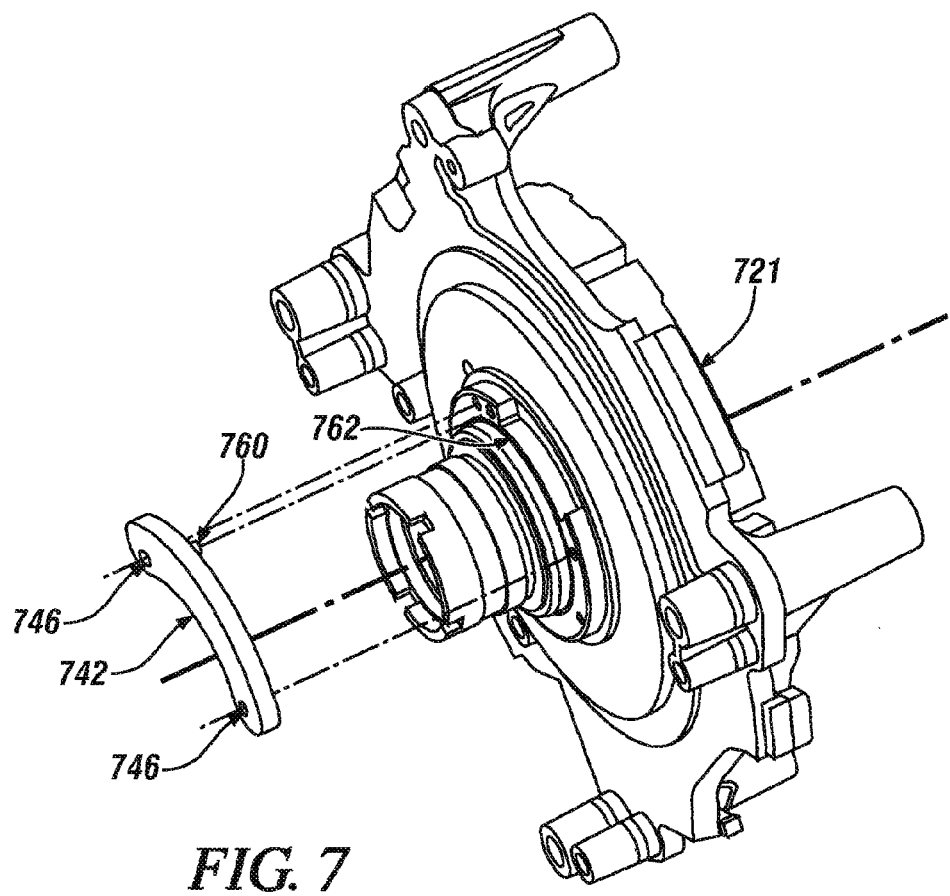
FIG. 7 illustrates a disassembled view of the transmission including the sensor stator and an exemplary alignment of the sensor stator and a stationary member using a locator-pin arrangement in accordance with the disclosure.

FIG. 7 illustrates an exploded view of the transmission 10 of FIG. 1 including the sensor stator 742 and an exemplary alignment of the sensor stator 742 and a stationary member 721 of the torque machine 20 using a locator-pin arrangement. In an exemplary embodiment stationary member 721 is a portion of the torque machine stator to which sensor stator may be mounted. Pin 760 on sensor stator 742 is positioned such that when it is inserted into locator 762 the sensor stator 742 achieves a desired alignment with the stationary member 721 of the torque machine 20. The sensor stator 742 includes a plurality of alignment slots 746, and is fixedly attached to the stationary member 721 of stator 22 of the torque machine 20 using a plurality of mounting bolts 43 that pass through the alignment slots 746 and fasten the sensor stator 742 to the stationary member 721 of the torque machine 20. The locator-pin arrangement is used to ensure that the Hall sensors positioned on the sensor stator 742 are aligned to the desired magnetic axis of the stator 22.

Figure 8:
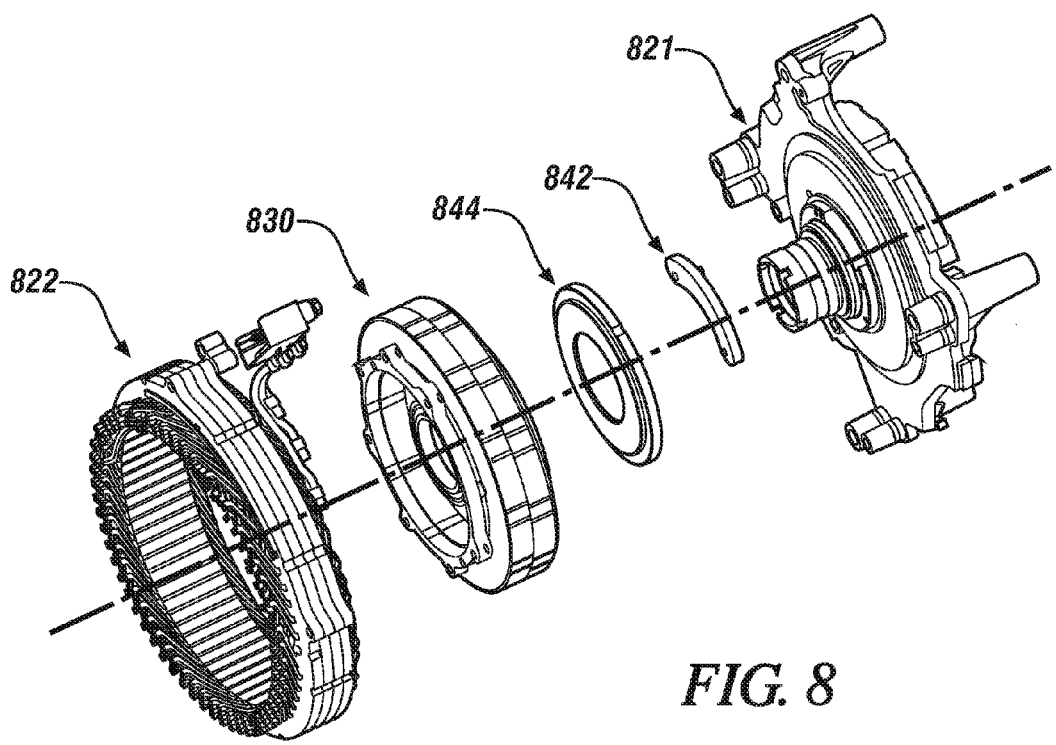
FIG. 8 illustrates a disassembled view of the transmission including the rotational position sensor and the torque machine including an exemplary alignment of the sensor components and the torque machine components in accordance with the disclosure.

FIG. 8 illustrates an exploded view of the transmission 10 of FIG. 1 including the rotational position sensor and the torque machine including an exemplary alignment of the sensor components and the torque machine components. Sensor stator 842 is mounted to stationary member 821 using the pin-locator to ensure the desired alignment as described with reference to FIG. 7. Sensor rotor 844 is aligned with rotor 830 using the key and key way as described with reference to FIG. 5. Stator 822 is then mounted, and is aligned with respect to the Hall sensor of sensor stator 842 as described with reference to FIG. 6. The sensor rotor 844 is aligned to a known reference angle on the rotor 830 and the sensor stator 842 is aligned to known reference angle on the stator 822.

Figure 9:
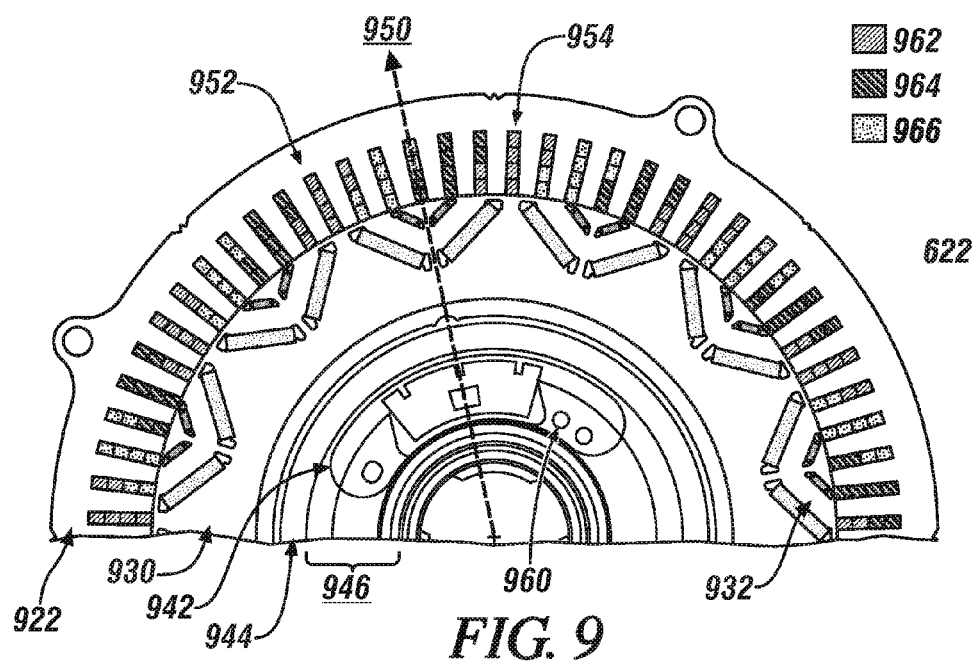
FIG. 9 illustrates a partial side view of the transmission including the sensor rotor and sensor stator of the rotational position sensor and the rotor and stator of the torque machine having an exemplary alignment along a magnetic axis in accordance with the disclosure.

FIG. 9 illustrates a partial side view of the transmission 10 of FIG. 1 including the sensor rotor 944 and sensor stator 942 of the rotational position sensor and the rotor 930 and stator 922 of the torque machine 20 having an exemplary alignment along a magnetic axis 950. In an exemplary embodiment magnetic axis 950 is the rotor d-axis of rotor 930. The sensor stator 942 is positioned using pin-locator 960 such that the axis of phase-A is aligned with the rotor d-axis along magnetic axis 950. The stator 922 has multiple phases, including Phase-A 962, Phase-B 964 and Phase-C 966. The magnetic axis of phase-A runs along axis 950 and is positioned between the phase-A positions 952 and 954. The sensor rotor magnetization 946 of sensor rotor 944, the sensor stator 942, the rotor 930 and the stator 922 are all aligned along rotor d-axis 950.

Figure 10:
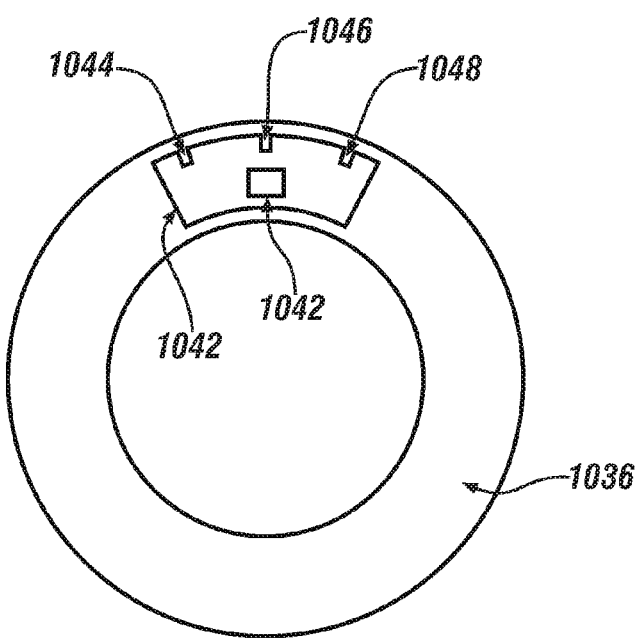
FIG. 10 illustrates a partial side view of an exemplary embodiment of the sensor stator of the rotational position sensor having a circular support structure in accordance with the disclosure.

FIG. 10 illustrates a partial side view of an exemplary embodiment of the sensor stator 1042 of the rotational position sensor having a circular support structure 1036. In an exemplary embodiment, Hall sensors 1044, 1046, 1048 and ASIC 1040 of the sensor stator 1042 may be positioned on a circular support structure 1036 for a more robust design.

Figure 11:
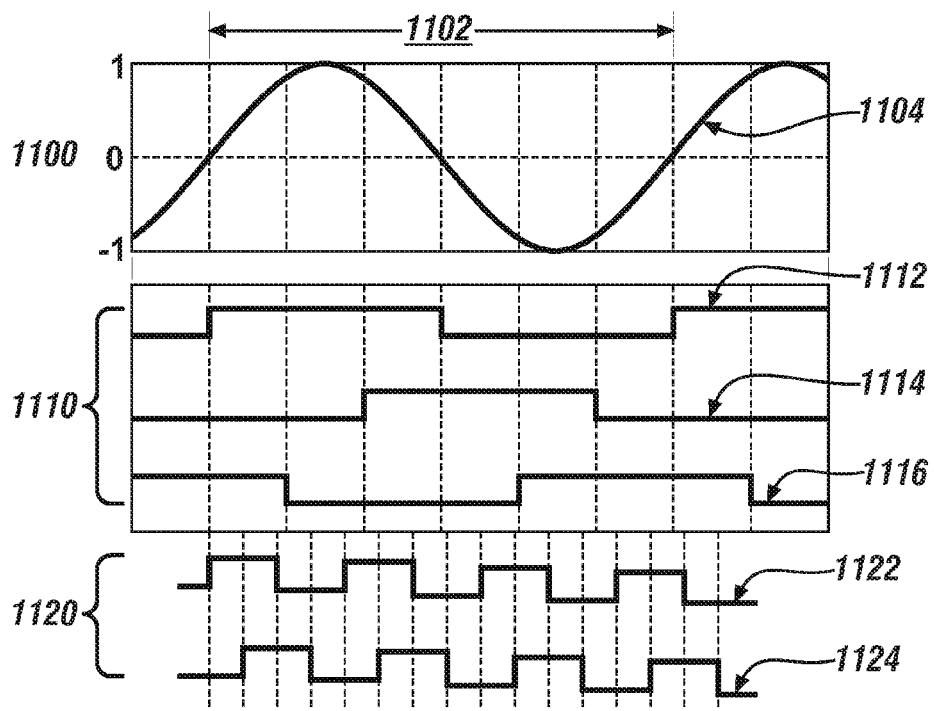
FIG. 11 graphically shows exemplary rotational position sensor output signals along with a normalized back-emf waveform in accordance with the disclosure.

FIG. 11 graphically shows exemplary rotational position sensor output signals along with a normalized back-emf waveform. Plot 1100 depicts normalized Phase-A back-emf waveform 1104 over one electrical cycle 1102. Plot 1110 depicts commutation signals 1112, 1114, 1116 generated by the Hall sensors. Commutation signal 1112 is generated by Hall sensor $H_A$, commutation signal 1114 is generated by Hall sensor $H_B$, commutation signal 1116 is generated by Hall sensor $H_C$. The rising edge of commutation pulse 1112 is aligned with the positive zero crossing of Phase-A back-emf 1104 due to the alignment of Hall sensor $H_A$ with the magnetic axis of Phase-A. Plot 1120 depicts high resolution quadrature signals 1122 and 1124 which are generated by the ASIC of the sensor stator. The horizontal axis of plot 1120 is marked in segments of 90° 1126. The leading edge of high resolution signal $E_A$ 1122 is aligned with the positive zero crossing of Phase-A back-emf 1104. The leading edge of high resolution signal $E_B$ 1124 is offset by 90° from high resolution signal $E_A$ 1122.

A sensor control module may be configured to monitor the commutation signals 1112, 1114, 1116 generated by the Hall sensors and the high resolution quadrature signals 1122 and 1124 which are generated by the ASIC of the sensor stator. The sensor control module can then determine an absolute rotor position of the rotor of the torque machine based on the monitored commutation signals 1112, 1114, 1116, the monitored high resolution quadrature signals 1122, 1124, and the known reference angles between the rotor magnets of the sensor rotor and the rotor poles of the torque machine rotor and between the sensor stator and the torque machine stator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a transmission assembly including an integrated torque machine, comprising:
    a torque machine stator including a stationary member secured to a case of the transmission assembly and supporting a spindle;
    a torque machine rotor rotatably coupled to said spindle, including at least one set of torque machine rotor magnets, and fixedly coupled to a gear element of the transmission;
    an integrated rotational position sensor configured to monitor rotational position of the torque machine rotor in relation to the torque machine stator and including a sensor rotor element and a sensor stator element;
    the sensor rotor element including at least one set of sensor rotor magnets;
    the sensor rotor element secured to said torque machine rotor such that the at least one set of sensor rotor magnets are aligned with respect to a rotor pole of the at least one set of torque machine rotor magnets; and
    the sensor stator element secured to said stationary member such that the sensor stator element is aligned with a magnetic axis of the torque machine stator.

2. The apparatus of claim 1, wherein the sensor rotor element further comprises a rotor key inserted into a keyway of the torque machine rotor.

3. The apparatus of claim 1, wherein the sensor stator element includes a pin element and said stationary member of the torque machine stator includes a locator element, the pin element coupled with the locator element to align the sensor stator element with said magnetic axis of the torque machine stator.

4. The apparatus of claim 1, wherein:
    the sensor rotor element includes a commutation magnetic track and a high resolution magnetic track; and the sensor stator element includes at least one Hall-effect sensor to generate at least one commutation signal and at least one sensor ASIC to generate at least one high resolution signal.

5. The apparatus of claim 4, wherein the commutation magnetic track and the high resolution magnetic track are magnetized with reference to a key mechanism.

6. The apparatus of claim 4, wherein the number of pole pairs in the commutation track match the number of pole pairs in the torque machine.

7. The apparatus of claim 4, wherein the high resolution magnetic track is magnetized in a sinusoid fashion and the commutation magnetic track is magnetized in a rectangular fashion.

8. The apparatus of claim 1, wherein the sensor stator element includes a circular support structure.

* * * * *